(12) United States Patent
Orr

(10) Patent No.: US 7,548,563 B1
(45) Date of Patent: Jun. 16, 2009

(54) DATA TRANSMISSION USING ADDRESS ENCODING

(75) Inventor: Michael Orr, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 701 days.

(21) Appl. No.: 11/196,993

(22) Filed: Aug. 4, 2005

Related U.S. Application Data

(60) Provisional application No. 60/667,894, filed on Apr. 1, 2005.

(51) Int. Cl.
  *H04J 3/00* (2006.01)
(52) U.S. Cl. .................. 370/476; 370/474; 370/475; 370/349
(58) Field of Classification Search ........... 370/471, 370/909, 395.5, 474, 475, 349, 476
  See application file for complete search history.

(56) References Cited

U.S. PATENT DOCUMENTS

| | | | | |
|---|---|---|---|---|
| 3,828,137 A | * | 8/1974 | Monford, Jr. | 370/294 |
| 4,771,458 A | * | 9/1988 | Citta et al. | 380/239 |
| 5,917,821 A | * | 6/1999 | Gobuyan et al. | 370/392 |
| 6,047,333 A | * | 4/2000 | Roussel | 709/250 |
| 6,115,379 A | * | 9/2000 | Flanders et al. | 370/392 |
| 6,771,673 B1 | * | 8/2004 | Baum et al. | 370/535 |
| 6,785,738 B1 | * | 8/2004 | Ivaturi | 709/245 |
| 7,069,436 B1 | * | 6/2006 | Akachi | 713/162 |
| 7,310,688 B1 | * | 12/2007 | Chin | 709/252 |
| 7,315,555 B2 | * | 1/2008 | Cyr et al. | 370/474 |
| 7,369,553 B2 | * | 5/2008 | Tasaki et al. | 370/390 |
| 7,415,535 B1 | * | 8/2008 | Kuik et al. | 709/245 |
| 2003/0225994 A1 | * | 12/2003 | Moniot et al. | 711/212 |
| 2004/0090989 A1 | * | 5/2004 | Kobayashi | 370/469 |
| 2004/0208199 A1 | * | 10/2004 | Li | 370/474 |

FOREIGN PATENT DOCUMENTS

EP  WO 2004/066589 A1 * 8/2004

OTHER PUBLICATIONS

IEEE ; "IEEE Standard for local and Metropolitan Area Networks: Overview and Architecture Amendment 1: Ethertpes for Protoypes and Vendor-Specfic Protocol Development"; 2003; pp. 1-5.*

* cited by examiner

*Primary Examiner*—Ricky Ngo
*Assistant Examiner*—Dewanda Samuel

(57) ABSTRACT

An apparatus having a corresponding method and computer program comprises an output circuit to transmit a frame of data, the frame comprising an N-bit address field; an encoder to encode J bits of an N-bit address as an M-bit binary number, wherein M<J and J≦N; and an address circuit to place the M-bit binary number and a K-bit binary number in the N-bit address field before the output circuit transmits the frame of data, wherein K≦J−M.

39 Claims, 9 Drawing Sheets

DATA TRANSMISSION USING ADDRESS ENCODING

CROSS-REFERENCE TO RELATED APPLICATIONS

This application claims the benefit of U.S. Provisional Patent Application Ser. No. 60/667,894 entitled "Compressing MAC Addresses to Make Room for Meta Information," filed Mar. 31, 2005, the disclosure thereof incorporated by reference herein in its entirety.

BACKGROUND

The present invention relates generally to data communications. More particularly, the present invention relates to data transmission using address encoding.

In data communication systems that transfer frames of data between switching elements, whether inside a single system, or between independent systems, it is often desirable to include with the frames some meta-information describing the frames. This allows the sender and receiver to coordinate activities and handling of the relevant frames. Due to the requirement of wire-speed processing, and because handling is necessarily frame-by-frame, it follows that the meta-information should be sent at the same rate as the frames, and preferably attached to the frames.

However, the Ethernet frame format, as defined by the IEEE standard 802.3, does not leave any room to attach meta-information to the frames. One possible approach is to add the meta-information to the frame. However, this is not possible when the frame is already at the maximum allowable length. In addition, any change in frame-content semantics should not violate the Ethernet standard in any way.

SUMMARY

In general, in one aspect, the invention features an apparatus comprising: an output circuit to transmit a frame of data, the frame comprising an N-bit address field; an encoder to encode J bits of an N-bit address as an M-bit binary number, wherein $M<J$ and $J \leq N$; and an address circuit to place the M-bit binary number and a K-bit binary number in the N-bit address field before the output circuit transmits the frame of data, wherein $K \leq J-M$.

Some embodiments comprise an input circuit to receive the frame of data comprising the N-bit address field, wherein the N-bit address field comprises the N-bit address; wherein the address circuit replaces the N-bit address in the N-bit address field with the M-bit binary number and the K-bit binary number before the output circuit transmits the frame of data. Some embodiments comprise an input circuit to receive the data. Some embodiments comprise a data source to provide the K-bit binary number. In some embodiments, the K-bit binary number represents one or more attributes of the frame. In some embodiments, the data source comprises: a processor to determine the one or more attributes of the frame. In some embodiments, the N-bit address is a media access control (MAC) address. In some embodiments, the J bits of the N-bit address represent an Organisational Unique Identifier (OUI). In some embodiments, the frame is an Ethernet frame. Some embodiments comprise a memory to store a table associating each OUI with an M-bit index; wherein, to encode the J bits of the N-bit address as the M-bit binary number, the encoder replaces the J-bit binary number with the associated M-bit index. In some embodiments, to encode the J bits of the N-bit address as the M-bit binary number, the encoder encodes the OUI according to a probability of occurrence of the OUI. In some embodiments, the M-bit binary number comprises a first binary number representing the J bits of the N-bit address and a second binary number representing a number of bits in the first binary number. In some embodiments, the encoder encodes the J bits of the N-bit address as the M-bit binary number according to at least one of the group consisting of: Huffman encoding; and arithmetic encoding. In some embodiments, the encoder adaptively determines the probability of occurrence of the OUI. In some embodiments, the encoder encodes the J bits of the N-bit address as the M-bit binary number according to at least one of the group consisting of: adaptive Huffman encoding; and adaptive arithmetic encoding. In some embodiments, a network device comprises the apparatus. In some embodiments, the network device is selected from the group consisting of: a switch; a router; and a network interface controller (NIC).

In general, in one aspect, the invention features a method comprising: transmitting a frame of data, the frame comprising an N-bit address field; encoding J bits of an N-bit address as an M-bit binary number, wherein $M<J$ and $J \leq N$; and placing the M-bit binary number and a K-bit binary number in the N-bit address field before the output circuit transmits the frame of data, wherein $K \leq J-M$.

Some embodiments comprise receiving the frame of data comprising the N-bit address field, wherein the N-bit address field comprises the N-bit address; wherein placing the M-bit binary number and a K-bit binary number in the N-bit address field comprises replacing the N-bit address in the N-bit address field with the M-bit binary number and the K-bit binary number. Some embodiments comprise receiving the data. Some embodiments comprise providing the K-bit binary number. In some embodiments, the K-bit binary number represents one or more attributes of the frame. Some embodiments comprise determining the one or more attributes of the frame. In some embodiments, the N-bit address is a media access control (MAC) address. In some embodiments, the J bits of the N-bit address represent an Organisational Unique Identifier (OUI). In some embodiments, the frame is an Ethernet frame. Some embodiments comprise associating each OUI with an M-bit index; wherein encoding the J bits of the N-bit address as the M-bit binary number comprises replacing the J-bit binary number with the associated M-bit index. In some embodiments, encoding the J bits of the N-bit address as the M-bit binary number comprises encoding the OUI according to a probability of occurrence of the OUI. In some embodiments, the M-bit binary number comprises a first binary number representing the J bits of the N-bit address and a second binary number representing a number of bits in the first binary number. In some embodiments, the J bits of the N-bit address as the M-bit binary number are encoded according to at least one of the group consisting of: Huffman encoding; and arithmetic encoding. In some embodiments, encoding comprises: adaptively determining the probability of occurrence of the OUI. In some embodiments, the J bits of the N-bit address as the M-bit binary number are encoded according to at least one of the group consisting of: adaptive Huffman encoding; and adaptive arithmetic encoding.

In general, in one aspect, the invention features an apparatus comprising: an input circuit to receive a frame of data comprising an N-bit address field comprising a J-bit binary number, wherein $J \leq N$; a decoder to decode M bits of the J-bit binary number as a J-bit address, wherein $M<J$; and an address circuit to provide K further bits of the J-bit binary number, wherein $K \leq J-M$.

In some embodiments, the address circuit replaces the J-bit binary number in the N-bit address field of the frame with the J-bit address. Some embodiments comprise an output circuit to transmit the frame comprising the N-bit address field comprising the J-bit address. Some embodiments comprise an output circuit to transmit the data. In some embodiments, the K-bit binary number represents one or more attributes of the frame. Some embodiments comprise a processor to process the frame according to one or more of the one or more attributes of the frame. In some embodiments, the N-bit address is a media access control (MAC) address. In some embodiments, the J-bit address represents an Organisational Unique Identifier (OUI). In some embodiments, the frame is an Ethernet frame. Some embodiments comprise a memory to store a table associating each OUI with an M-bit index; wherein, to decode the M bits of the J-bit binary number as the J-bit address, the decoder replaces the M bits of the J-bit binary number with the associated OUI. In some embodiments, the decoder decodes the M bits of the J-bit binary number according to a probability of occurrence of the OUI. In some embodiments, the M bits represent a first binary number representing the J-bit address and a second binary number representing a number of bits in the first binary number. In some embodiments, the decoder decodes the M bits of the J-bit binary number according to at least one of the group consisting of: Huffman encoding; and arithmetic encoding. In some embodiments, the decoder adaptively determines the probability of occurrence of the OUI. In some embodiments, the decoder decodes the M bits of the J-bit binary number according to at least one of the group consisting of: adaptive Huffman encoding; and adaptive arithmetic encoding. In some embodiments, a network device comprises the apparatus. In some embodiments, the network device is selected from the group consisting of: a switch; a router; and a network interface controller (NIC).

In general, in one aspect, the invention features a method comprising: receiving a frame of data comprising an N-bit address field comprising a J-bit binary number, wherein J≦N; decoding M bits of the J-bit binary number as a J-bit address, wherein M<J; and an address circuit to provide K further bits of the J-bit binary number, wherein K≦J−M.

Some embodiments comprise replacing the J-bit binary number in the N-bit address field of the frame with the J-bit address. Some embodiments comprise transmitting the frame comprising the N-bit address field comprising the J-bit address. Some embodiments comprise transmitting the data. In some embodiments, the K-bit binary number represents one or more attributes of the frame. Some embodiments comprise processing the frame according to one or more of the one or more attributes of the frame. In some embodiments, the J-bit address is a media access control (MAC) address. In some embodiments, the J-bit address represents an Organisational Unique Identifier (OUI). In some embodiments, the frame is an Ethernet frame. Some embodiments comprise associating each OUI with an M-bit index; wherein decoding the M bits of the J-bit binary number as the J-bit address comprises replacing the M bits of the J-bit binary number with the associated OUI. In some embodiments, the M bits of the J-bit binary number are decoded according to a probability of occurrence of the OUI. In some embodiments, the M bits represent a first binary number representing the J-bit address and a second binary number representing a number of bits in the first binary number. In some embodiments, the M bits of the J-bit binary number are decoded according to at least one of the group consisting of: Huffman encoding; and arithmetic encoding. Some embodiments comprise adaptively determining the probability of occurrence of the OUI. In some embodiments, the M bits of the J-bit binary number are decoded according to at least one of the group consisting of: adaptive Huffman encoding; and adaptive arithmetic encoding.

In general, in one aspect, the invention features a frame of data comprising: a payload field comprising the data; and at least one N-bit address field comprising an N-bit address comprising an M-bit binary number representing an encoded J-bit address of the frame of data, wherein M<J and J≦N.

In some embodiments, the N-bit address further comprises a K-bit binary number, wherein K≦J−M. In some embodiments, the K-bit binary number represents one or more attributes of the frame of data. In some embodiments, the N-bit address is a media access control (MAC) address. In some embodiments, the J-bit address represents an Organisational Unique Identifier (OUI). In some embodiments, the frame is an Ethernet frame. In some embodiments, each OUI is associated with a respective M-bit index; and wherein the M-bit binary number is the M-bit index associated with the OUI. In some embodiments, the J-bit address is encoded according to a probability of occurrence of the OUI. In some embodiments, the M bits represent a first binary number representing the J-bit address and a second binary number representing a number of bits in the first binary number. In some embodiments, the J-bit address is encoded according to at least one of the group consisting of: Huffman encoding; arithmetic encoding; adaptive Huffman encoding; and adaptive arithmetic encoding.

In general, in one aspect, the invention features an apparatus comprising: means for transmitting a frame of data, the frame comprising an N-bit address field; means for encoding J bits of an N-bit address as an M-bit binary number, wherein M<J and J≦N; and means for placing the M-bit binary number and a K-bit binary number in the N-bit address field before the output circuit transmits the frame of data, wherein K≦J−M. Some embodiments comprise means for receiving the frame of data comprising the N-bit address field, wherein the N-bit address field comprises the N-bit address; wherein the means for placing replaces the N-bit address in the N-bit address field with the M-bit binary number and the K-bit binary number before the output circuit transmits the frame of data. Some embodiments comprise means for receiving the data. Some embodiments comprise means for providing the K-bit binary number. In some embodiments, the K-bit binary number represents one or more attributes of the frame. In some embodiments, the data source comprises: means for determining the one or more attributes of the frame. In some embodiments, the N-bit address is a media access control (MAC) address. In some embodiments, the J bits of the N-bit address represent an Organisational Unique Identifier (OUI). In some embodiments, the frame is an Ethernet frame. Some embodiments comprise means for storing a table associating each OUI with an M-bit index; wherein, for encoding the J bits of the N-bit address as the M-bit binary number, the means for encoding replaces the J-bit binary number with the associated M-bit index. In some embodiments, for encoding the J bits of the N-bit address as the M-bit binary number, the means for encoding encodes the OUI according to a probability of occurrence of the OUI. In some embodiments, the M-bit binary number comprises a first binary number representing the J bits of the N-bit address and a second binary number representing a number of bits in the first binary number. In some embodiments, the means for encoding encodes the J bits of the N-bit address as the M-bit binary number according to at least one of the group consisting of: Huffman encoding; and arithmetic encoding. In some embodiments, the means for encoding adaptively determines the probability of occurrence of the OUI. In some embodiments, the means for encoding encodes the J bits of the N-bit address as the M-bit binary number according to at least one of the group consisting of: adaptive Huffman encoding; and adaptive arithmetic encoding. In some embodiments, a network device comprises the apparatus. In some embodiments, the network device is selected from the group consisting of: a switch; a router; and a network interface controller (NIC).

In general, in one aspect, the invention features a computer program comprising: in a frame comprising an N-bit address field, encoding J bits of an N-bit address as an M-bit binary number, wherein M<J and J≦N; and placing the M-bit binary number and a K-bit binary number in the N-bit address field before the output circuit transmits the frame of data, wherein K≦J−M.

In some embodiments, the N-bit address field comprises the N-bit address; and wherein placing the M-bit binary number and a K-bit binary number in the N-bit address field comprises replacing the N-bit address in the N-bit address field with the M-bit binary number and the K-bit binary number. Some embodiments comprise providing the K-bit binary number. In some embodiments, the K-bit binary number represents one or more attributes of the frame. Some embodiments comprise determining the one or more attributes of the frame. In some embodiments, the N-bit address is a media access control (MAC) address. In some embodiments, the J bits of the N-bit address represent an Organisational Unique Identifier (OUI). In some embodiments, the frame is an Ethernet frame. Some embodiments comprise associating each OUI with an M-bit index; wherein encoding the J bits of the N-bit address as the M-bit binary number comprises replacing the J-bit binary number with the associated M-bit index. In some embodiments, encoding the J bits of the N-bit address as the M-bit binary number comprises encoding the OUI according to a probability of occurrence of the OUI. In some embodiments, the M-bit binary number comprises a first binary number representing the J bits of the N-bit address and a second binary number representing a number of bits in the first binary number. In some embodiments, the J bits of the N-bit address as the M-bit binary number are encoded according to at least one of the group consisting of: Huffman encoding; and arithmetic encoding. In some embodiments, encoding comprises: adaptively determining the probability of occurrence of the OUI. In some embodiments, the J bits of the N-bit address as the M-bit binary number are encoded according to at least one of the group consisting of: adaptive Huffman encoding; and adaptive arithmetic encoding.

In general, in one aspect, the invention features an apparatus comprising: means for receiving a frame of data comprising an N-bit address field comprising a J-bit binary number, wherein J≦N; means for decoding M bits of the J-bit binary number as a J-bit address, wherein M<J; and means for providing K further bits of the J-bit binary number, wherein K≦J−M.

In some embodiments, the means for providing replaces the J-bit binary number in the N-bit address field of the frame with the J-bit address. Some embodiments comprise means for transmitting the frame comprising the N-bit address field comprising the J-bit address. Some embodiments comprise means for transmitting the data. In some embodiments, the K-bit binary number represents one or more attributes of the frame. Some embodiments comprise means for processing the frame according to one or more of the one or more attributes of the frame. In some embodiments, the N-bit address is a media access control (MAC) address. In some embodiments, the J-bit address represents an Organisational Unique Identifier (OUI). In some embodiments, the frame is an Ethernet frame. Some embodiments comprise means for storing a table associating each OUI with an M-bit index; wherein, to decode the M bits of the J-bit binary number as the J-bit address, the means for decoding replaces the M bits of the J-bit binary number with the associated OUI. In some embodiments, the means for decoding decodes the M bits of the J-bit binary number according to a probability of occurrence of the OUI. In some embodiments, the M bits represent a first binary number representing the J-bit address and a second binary number representing a number of bits in the first binary number. In some embodiments, the means for decoding decodes the M bits of the J-bit binary number according to at least one of the group consisting of: Huffman encoding; and arithmetic encoding. In some embodiments, the means for decoding adaptively determines the probability of occurrence of the OUI. In some embodiments, the means for decoding decodes the M bits of the J-bit binary number according to at least one of the group consisting of: adaptive Huffman encoding; and adaptive arithmetic encoding. In some embodiments, a network device comprises the apparatus. In some embodiments, the network device is selected from the group consisting of: a switch; a router; and a network interface controller (NIC).

In general, in one aspect, the invention features a computer program comprising: in a frame of data comprising an N-bit address field comprising a J-bit binary number, wherein J≦N, decoding M bits of the J-bit binary number as a J-bit address, wherein M<J; and providing K further bits of the J-bit binary number, wherein K≦J−M.

Some embodiments comprise replacing the J-bit binary number in the N-bit address field of the frame with the J-bit address. In some embodiments, the K-bit binary number represents one or more attributes of the frame. Some embodiments comprise processing the frame according to one or more of the one or more attributes of the frame. In some embodiments, the J-bit address is a media access control (MAC) address. In some embodiments, the J-bit address represents an Organisational Unique Identifier (OUI). In some embodiments, the frame is an Ethernet frame. Some embodiments comprise associating each OUI with an M-bit index; wherein decoding the M bits of the J-bit binary number as the J-bit address comprises replacing the M bits of the J-bit binary number with the associated OUI. In some embodiments, the M bits of the J-bit binary number are decoded according to a probability of occurrence of the OUI. In some embodiments, the M bits represent a first binary number representing the J-bit address and a second binary number representing a number of bits in the first binary number. In some embodiments, the M bits of the J-bit binary number are decoded according to at least one of the group consisting of: Huffman encoding; and arithmetic encoding. Some embodiments comprise adaptively determining the probability of occurrence of the OUI. In some embodiments, the M bits of the J-bit binary number are decoded according to at least one of the group consisting of: adaptive Huffman encoding; and adaptive arithmetic encoding.

The details of one or more implementations are set forth in the accompanying drawings and the description below. Other features will be apparent from the description and drawings, and from the claims.

Figure 1:
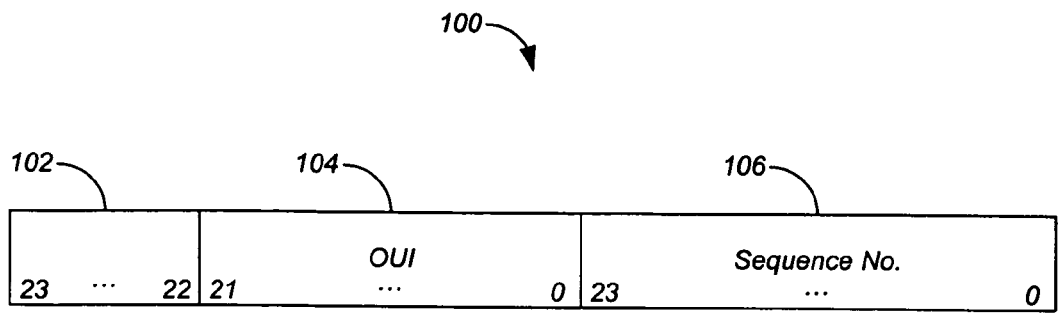
FIG. 1 shows the structure of a MAC address field.

The leading digit(s) of each reference numeral used in this specification indicates the number of the drawing in which the reference numeral first appears.

DETAILED DESCRIPTION

All Ethernet frames contain two address fields, known as the source and destination media access control (MAC) addresses. FIG. 1 shows the structure of a MAC address field 100. Both the source and destination MAC addresses have the structure shown in FIG. 1.

Referring to FIG. 1, MAC address field 100 comprises six bytes. The upper three bytes comprise a two-bit field 102 (bits 22-23) that is assigned and a 22-bit OUI field 104 (bits 0-21) that represents an Organisational Unique Identifier (OUI) representing the identity of a vendor of the device to which the MAC address refers. The lower three bytes 106 represent a sequence number assigned to the device by the vendor.

While the 22 bits of the OUI permit the unique identification of $2^{22}-1$ vendors, in practice only approximately 10,000 OUIs have been allocated to vendors. Further, only approximately 1,000 OUIs are currently in use worldwide, only a few tens of which are likely to be in use on any particular network.

The inventor has recognized that this situation permits one or both MAC address fields 100 within each Ethernet frame to be used to transport meta-information describing the frame.

Embodiments of the present invention compress portions of one or both MAC addresses within Ethernet frames, thereby freeing bits for use to convey meta-information describing the frames. While some embodiments of the present invention are described in terms of conveying meta-information in Ethernet frames, other embodiments of the present invention are not so limited. For example, the information conveyed is not limited to meta-information describing the frames, but can be any sort of information. Indeed, embodiments of the present invention provide a communication channel using the MAC address fields. In addition, address fields in other sorts of frames and packets can be used to convey information using the techniques disclosed herein. Further, while various compression techniques are described, embodiments of the present invention are not dependent on those techniques, and can employ any sort of compression technique either existing or under development.

Figure 2:
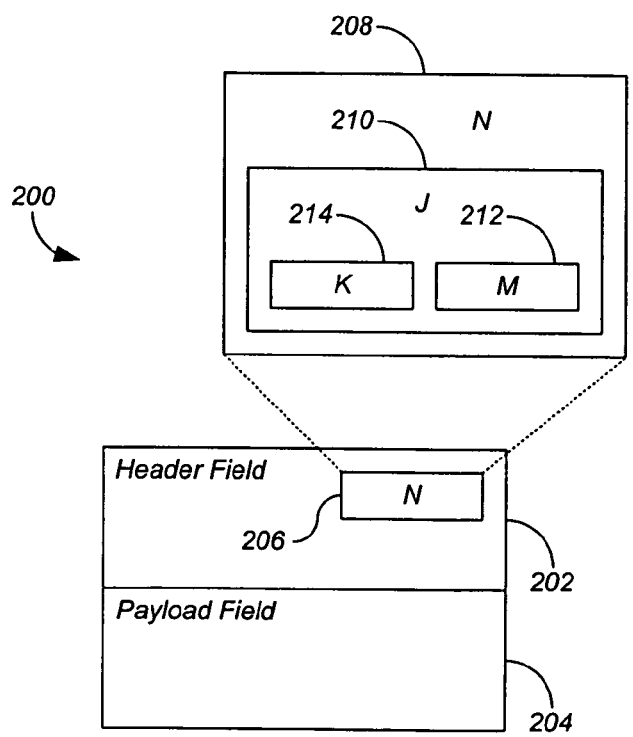
FIG. 2 shows a frame of data according to a preferred embodiment of the present invention.

FIG. 2 shows a frame 200 of data according to a preferred embodiment of the present invention. Frame 200 comprises a header field 202 and a payload field 204 comprising the data. Header field 202 comprises at least one N-bit address field 206 comprising an N-bit address 208 such as a MAC address. The N-bit address comprises a J-bit binary number 210 comprising an M-bit binary number 212 representing an encoded J-bit address of frame 200, wherein M<J and J≦N. The J-bit address can be encoded by any technique including those described below. The J-bit address can represent an identifier of a vendor of network devices such as an Organisational Unique Identifier (OUI).

Preferably the N-bit address field further comprises a K-bit binary number 214, wherein K≦J−M. The K-bit binary number can represent any sort of data. The data can have any sort of structure, for example Flags/Op-code/data, Type-Len-Value (TLV), and the like. The data can point to other places in frame 200 containing other data. For example, because the Offset field in an IP frame is generally unused, data can be stored there, and the K-bit binary number can indicate the presence of the data in the Offset field. As another example, if a frame 200 to be sent is less than the maximum size, additional data can be appended to the data in the frame 200 up to the maximum size, and the K-bit binary number can indicate the presence of the additional data. As another example, the K-bit binary number can represent one or more attributes of frame 200. Further, the bits of each of the K-bit and M-bit binary numbers can be contiguous, or can be interleaved with each other.

While the K-bit binary numbers 214 made available according to embodiments of the present invention offer advantages to network devices implemented according to these embodiments, their presence causes no difficulty to conventional network devices that are unable to use this additional data. Indeed, conventional network devices simply understand the N-bit address 208 as a standard network address. Therefore embodiments of the present invention integrate well with conventional data communications networks such as Ethernet networks.

Figure 3:
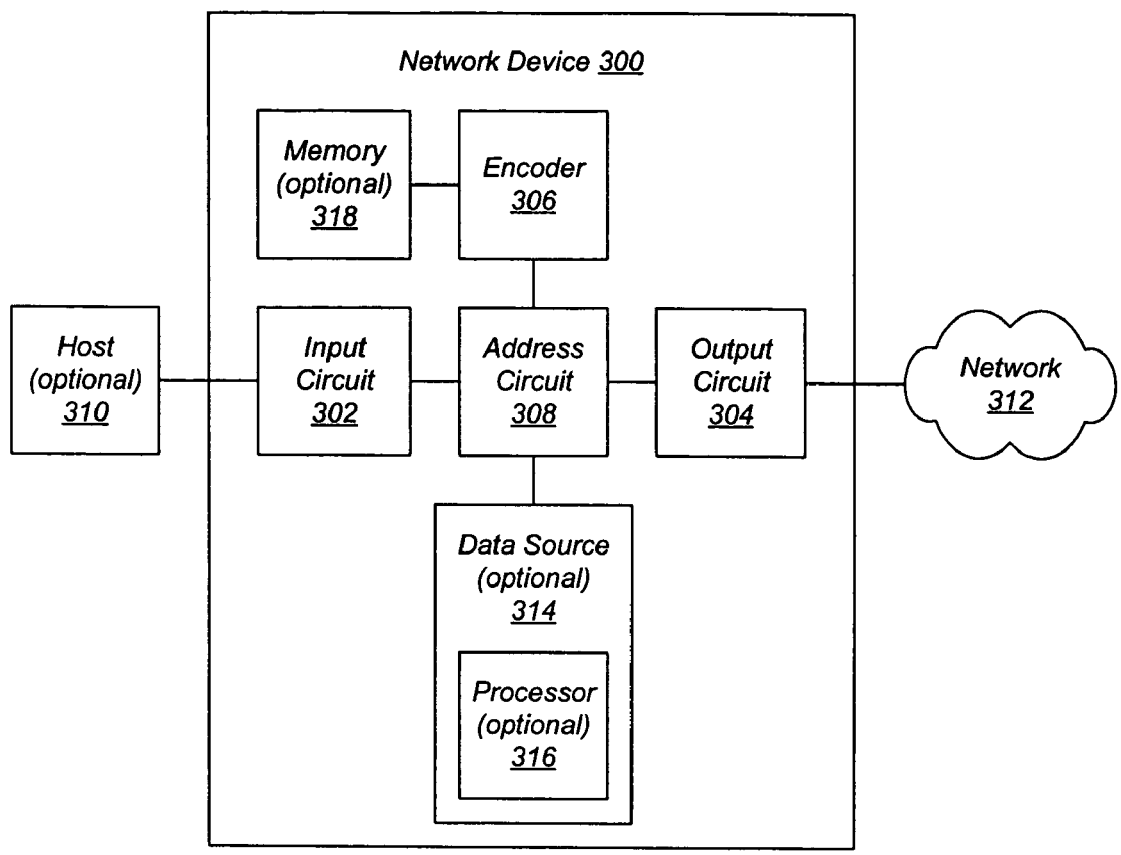
FIG. 3 shows a network device to transmit frames of data according to a preferred embodiment of the present invention.

FIG. 3 shows a network device 300 to transmit frames of data according to a preferred embodiment of the present invention. Network device 300 can be implemented as a network interface controller (NIC) and the like. Network device 300 comprises an input circuit 302 to receive data, for example from an optional host 310, an output circuit 304 to transmit frames of data, for example to a network 312 such as a local-area network, an encoder 306 to encode portions of the addresses of the frames, and an address circuit 308 to place the encoded addresses in the address fields of the frames prior to transmission. Network device 300 optionally comprises a data source 314, which optionally comprises a processor 316, and optionally comprises a memory 318.

Figure 4:
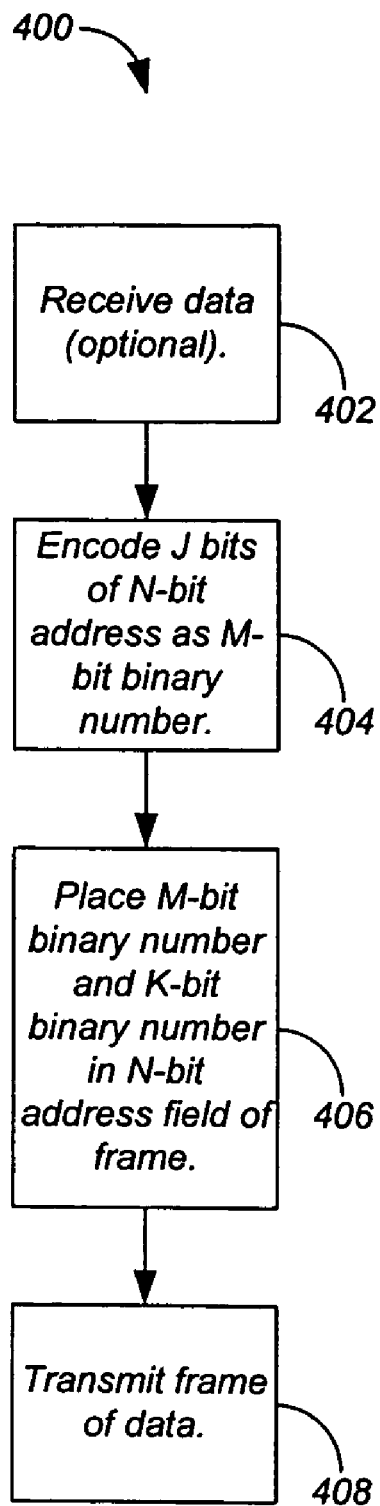
FIG. 4 shows a process for the network device of FIG. 3 according to a preferred embodiment of the present invention.

FIG. 4 shows a process 400 for network device 300 of FIG. 3 according to a preferred embodiment of the present invention. Input circuit 302 optionally receives data (step 402), for example from optional host 310. Alternatively, optional data source 314 generates the data. Encoder 306 encodes J bits of an N-bit address as an M-bit binary number, where M<J and J≦N (step 404), which frees K bits of the address for other uses. For example, encoder 306 encodes the 21-bit OUI of a MAC address for an Ethernet frame as a 15-bit binary number, thereby freeing 6 bits of the frame for other uses.

Any encoding technique can be used. For example, each OUI can simply be replaced by its ordinal IEEE allocation number or index. According to these embodiments, optional memory 318 stores a table associating each OUI with its M-bit index, and encoder 306 replaces the J-bit OUI with the associated M-bit index.

Other more powerful encoding and compression techniques such as Huffman encoding and arithmetic encoding can free more bits K of the frame for other uses. For example, encoder 306 can employ entropy encoding techniques that consider the probability of occurrence of the OUI, which can be empirically determined and stored in optional memory 318, or can be adaptively determined by encoder 306 during operation. For example, adaptive Huffman encoding and adaptive arithmetic encoding can be used. Because entropy coding techniques produce variable-length results, the M-bit binary number can comprise a first binary number representing the J bits of the encoded N-bit address and a second binary number that represents the number of bits in the first binary number.

Network device 300 places the data into a frame according to conventional techniques. Address circuit 308 places the M-bit binary number and a K-bit binary number in the N-bit address field of the frame, where $K \leq J-M$ (step 406). The K-bit binary number can comprise data supplied by optional host 310 or data generated by optional data source 314 of network device 300. For example, the K-bit binary number can represent one or more attributes of the frame that have been determined by optional processor 316. Other network devices can use this meta-information rather than spend time determining the attributes again. As another example, the K-bit binary numbers in each frame can constitute a separate communications channel between hosts 310.

Finally, output circuit 304 transmits, to network 312, the frame of data having the M-bit binary number and the K-bit binary number in the N-bit address field of the frame (step 408).

Figure 5:
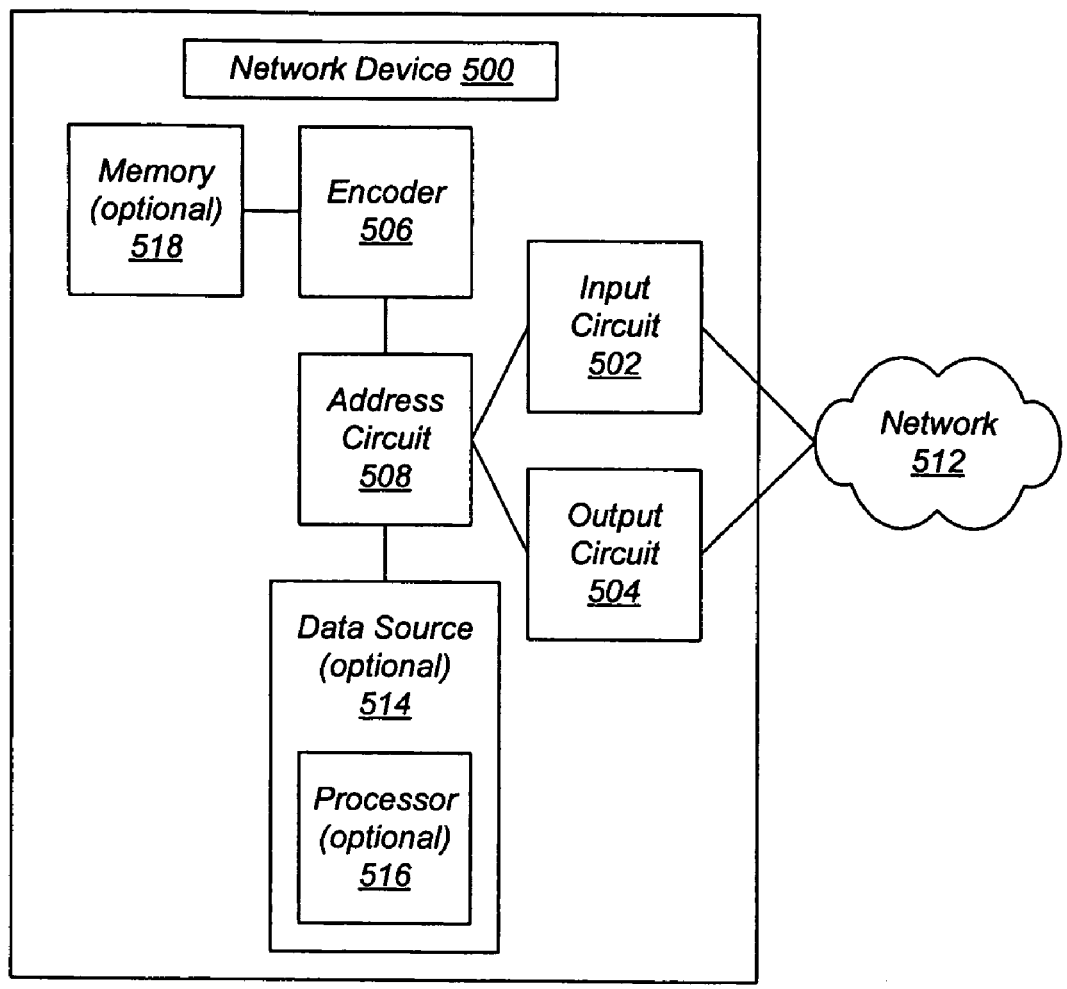
FIG. 5 shows a network device to receive and transmit frames of data according to a preferred embodiment of the present invention.

FIG. 5 shows a network device 500 to receive and transmit frames of data according to a preferred embodiment of the present invention. Network device 500 can be implemented as a switch, router, and the like. Network device 500 comprises an input circuit 502 to receive frames of data from a network 512 such as a local-area network, an output circuit 504 to transmit frames of data to network 512, an encoder 506 to encode portions of the addresses of the frames, and an address circuit 508 to place the encoded addresses in the address fields of the frames prior to transmission. Network device 500 optionally comprises a data source 514, which optionally comprises a processor 516, and optionally comprises a memory 518.

Figure 6:
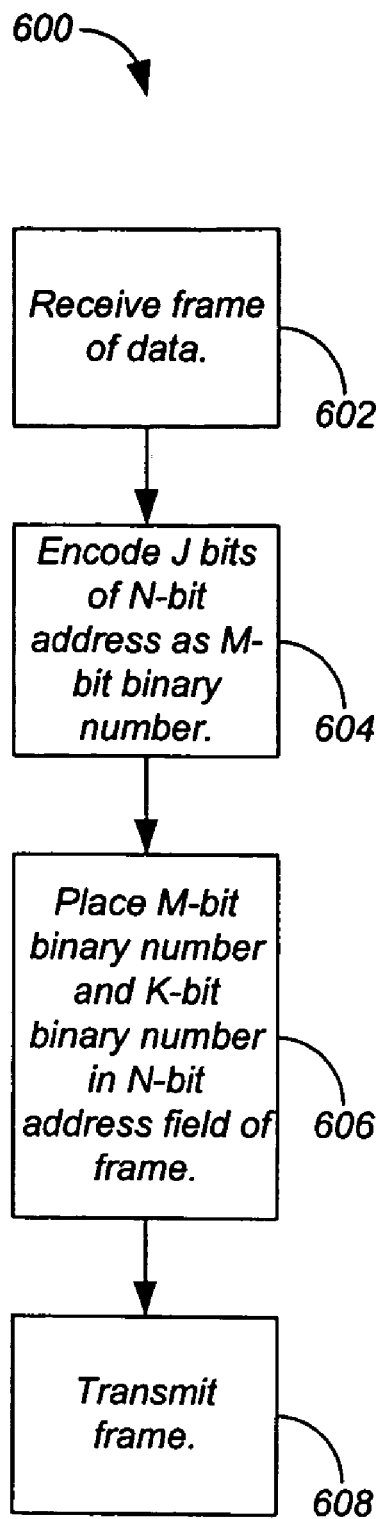
FIG. 6 shows a process for the network device of FIG. 5 according to a preferred embodiment of the present invention.

FIG. 6 shows a process 600 for network device 500 of FIG. 5 according to a preferred embodiment of the present invention. Input circuit 502 receives a frame of data from network 512 (step 602). The frame comprises one or more N-bit address fields, each comprising an N-bit address such as a source or destination MAC address.

Encoder 506 encodes J bits of the N-bit address as an M-bit binary number, where $M<J$ and $J \leq N$ (step 604), which frees K bits of the N-bit address field for other uses. For example, encoder 506 encodes the 21-bit OUI of a MAC address for an Ethernet frame as a 15-bit binary number, thereby freeing 6 bits of the frame for other uses.

Any encoding technique can be used. For example, each OUI can simply be replaced by its ordinal IEEE allocation number or index. According to these embodiments, optional memory 518 stores a table associating each OUI with its M-bit index, and encoder 506 replaces the J-bit OUI with the associated M-bit index.

Other more powerful encoding and compression techniques such as Huffman encoding and arithmetic encoding can free more bits K of the frame for other uses. For example, encoder 506 can employ entropy encoding techniques that consider the probability of occurrence of the OUI, which can be empirically determined and stored in optional memory 518, or can be adaptively determined by encoder 506 during operation. For example, adaptive Huffman encoding and adaptive arithmetic encoding can be used. Because entropy coding techniques produce variable-length results, the M-bit binary number can comprise a first binary number representing the J bits of the encoded N-bit address and a second binary number that represents the number of bits in the first binary number.

Address circuit 508 replaces the N-bit address in the N-bit address field with the M-bit binary number and the K-bit binary number, where $K \leq J-M$ (step 606). The K-bit binary number can comprise data generated by optional data source 514 of network device 500. For example, the K-bit binary number can represent one or more attributes of the frame that have been determined by optional processor 516. Other network devices can use this meta-information rather than spend time determining the attributes again.

Finally, output circuit 504 transmits, to network 512, the frame of data having the M-bit binary number and the K-bit binary number in the N-bit address field of the frame (step 608).

Figure 7:
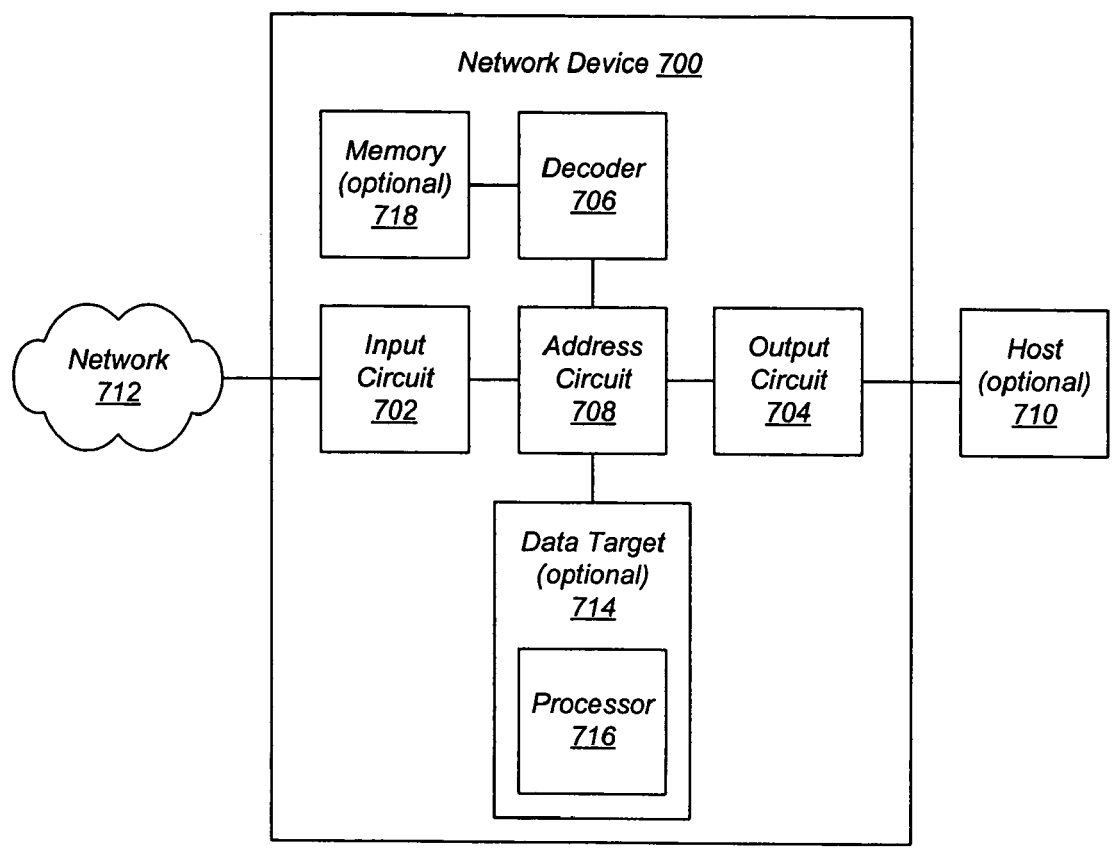
FIG. 7 shows a network device to receive frames of data according to a preferred embodiment of the present invention.

FIG. 7 shows a network device 700 to receive frames of data according to a preferred embodiment of the present invention. Network device 700 can be implemented as a network interface controller (NIC) and the like. Network device 700 comprises an input circuit 702 to receive frames of data, for example from a network 712 such as a local-area network, an output circuit 704 to transmit the data, for example to an optional host 710, a decoder 706 to decode portions of the addresses of the frames, and an address circuit 708. Network device 700 optionally comprises a data target 714, which comprises a processor 716, and optionally comprises a memory 718.

Figure 8:
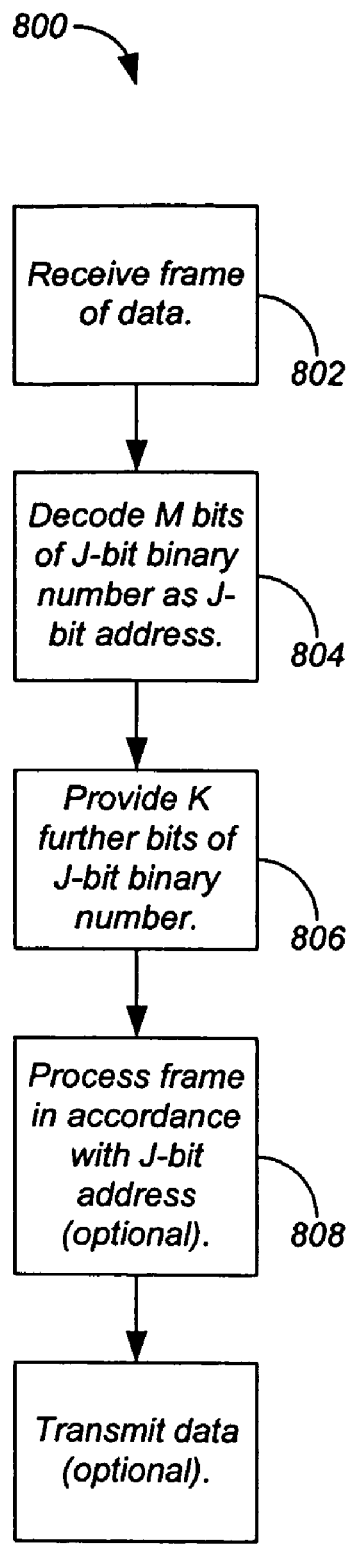
FIG. 8 shows a process for the network device of FIG. 7 according to a preferred embodiment of the present invention.

FIG. 8 shows a process 800 for network device 700 of FIG. 7 according to a preferred embodiment of the present invention. Input circuit 702 receives a frame of data from network 712 (step 802). The frame comprises one or more N-bit address fields such as source or destination MAC address fields each comprising a J-bit binary number, wherein $J \leq N$.

Decoder 706 decodes M bits of the J-bit binary number as a J-bit address, wherein $M<J$ (step 804). For example, decoder 706 decodes the J-bit binary number as a 21-bit OUI of a MAC address for an Ethernet frame. Any decoding technique can be used. For example, each M-bit binary number can represent the ordinal IEEE allocation number or index for a OUI. According to these embodiments, optional memory 718 stores a table associating each OUI with its M-bit index, and decoder 706 determines the OUI by applying the M-bit binary number as an index to the table.

Other more powerful decoding and decompression techniques such as Huffman decoding and arithmetic decoding can be used as well. For example, decoder 706 can employ entropy decoding techniques that consider the probability of occurrence of the OUI, which can be empirically determined and stored in optional memory 718, or can be adaptively determined by decoder 706 during operation. For example, adaptive Huffman encoding and adaptive arithmetic encoding can be used. Because entropy coding techniques produce variable-length results, the M-bit binary number can comprise a first binary number representing the encoded J-bit address and a second binary number that represents the number of bits in the first binary number.

Address circuit 708 provides K further bits of the J-bit binary number (step 806), wherein $K \leq J-M$. The K bits can comprise data for use by optional host 710 or for use by optional data target 714 of network device 700. For example, the K-bit binary number can represent one or more attributes of the frame. Network device 700 can use this meta-information rather than spend time determining the attributes again.

As another example, the K-bit binary numbers in each frame can constitute a separate communications channel between hosts 710.

Optional processor 716 optionally processes the frame in accordance with the J-bit address (step 808). For example, when the J-bit address is a destination MAC address, processor 716 determines whether network device 700 is the intended recipient of the frame based on the J-bit address. As another example, when the J-bit address is a source MAC address, processor 716 modifies one or more address tables in optional memory 718 according to the source MAC address. Finally, output circuit 704 optionally transmits the data from the frame to optional host 710 (step 810).

Figure 9:
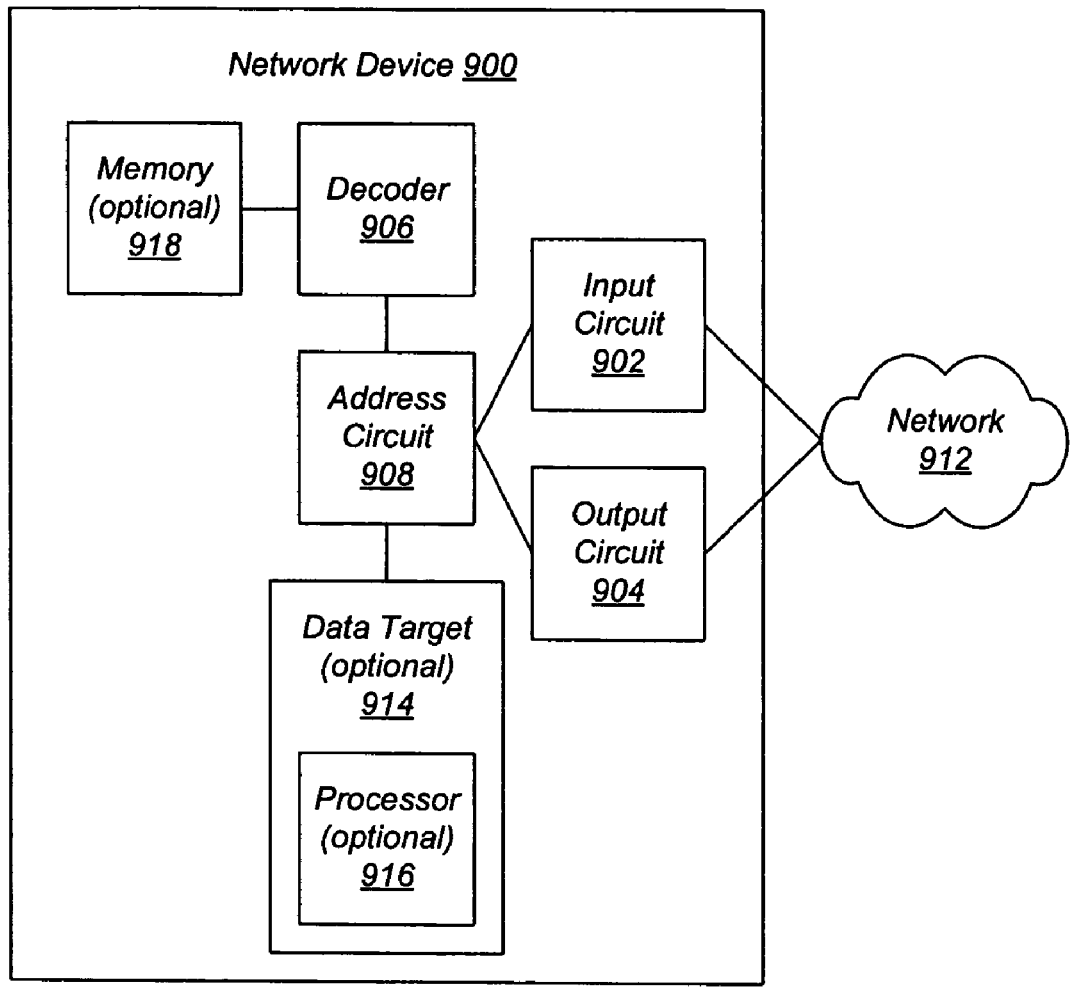
FIG. 9 shows a network device to receive and transmit frames of data according to a preferred embodiment of the present invention.

FIG. 9 shows a network device 900 to receive and transmit frames of data according to a preferred embodiment of the present invention. Network device 900 can be implemented as a switch, router, and the like. Network device 900 comprises an input circuit 902 to receive frames of data from a network 912 such as a local-area network, an output circuit 904 to transmit frames of data to network 912, a decoder 906 to decode portions of the addresses of the frames, and an address circuit 908 to place the decoded addresses in the address fields of the frames prior to transmission. Network device 900 optionally comprises a data target 914, which comprises a processor 916, and optionally comprises a memory 918.

Figure 10:
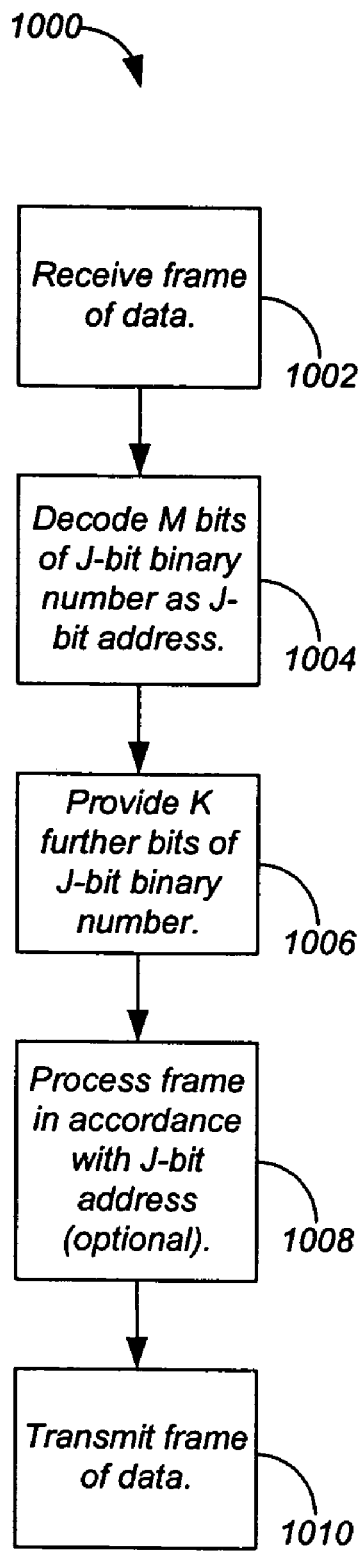
FIG. 10 shows a process for the network device of FIG. 9 according to a preferred embodiment of the present invention.

FIG. 10 shows a process 1000 for network device 900 of FIG. 9 according to a preferred embodiment of the present invention. Input circuit 902 receives a frame of data from network 912 (step 1002). The frame comprises one or more N-bit address fields such as a source or destination MAC address fields each comprising a J-bit binary number, wherein $J \leq N$.

Decoder 906 decodes M bits of the J-bit binary number as a J-bit address, wherein M<J (step 1004). For example, decoder 906 decodes the J-bit binary number as a 21-bit OUI of a MAC address for an Ethernet frame. Any decoding technique can be used. For example, each M-bit binary number can represent the ordinal IEEE allocation number or index for a OUI. According to these embodiments, optional memory 918 stores a table associating each OUI with its M-bit index, and decoder 906 determines the OUI by applying the M-bit binary number as an index to the table.

Other more powerful decoding and decompression techniques such as Huffman decoding and arithmetic decoding can be used as well. For example, decoder 906 can employ entropy decoding techniques that consider the probability of occurrence of the OUI, which can be empirically determined and stored in optional memory 918, or can be adaptively determined by decoder 906 during operation. For example, adaptive Huffman encoding and adaptive arithmetic encoding can be used. Because entropy coding techniques produce variable-length results, the M-bit binary number can comprise a first binary number representing the encoded J-bit address and a second binary number that represents the number of bits in the first binary number.

Address circuit 908 provides K further bits of the J-bit binary number (step 1006), wherein $K \leq J-M$. The K bits can comprise data for use by optional data target 914 of network device 900. For example, the K-bit binary number can represent one or more attributes of the frame. Network device 900 can use this meta-information rather than spend time determining the attributes again.

Optional processor 916 optionally processes the frame in accordance with the J-bit address (step 1008). For example, when the J-bit address is a destination MAC address, processor 916 forwards the frame based on the J-bit address. As another example, when the J-bit address is a source MAC address, processor 916 modifies one or more address tables in optional memory 918 according to the source MAC address. Finally, output circuit 904 transmits the data from the frame to network 912 (step 1010).

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus comprising:
    an output circuit to transmit a frame of data, the frame of data comprising an N-bit address field, where N is an integer greater than 1;
    an encoder to encode J bits of an N-bit address as an M-bit binary number, wherein J and M are integers greater than 1, and M<J and $J \leq N$; and
    an address circuit to place the M-bit binary number and a K-bit binary number in the N-bit address field before the output circuit transmits the frame of data, wherein K is an integer greater than or equal to 1, and $K \leq J-M$.

2. The apparatus of claim 1, further comprising:
    an input circuit to receive the frame of data comprising the N-bit address field, wherein the N-bit address field comprises the N-bit address;
    wherein the address circuit replaces the N-bit address in the N-bit address field with the M-bit binary number and the K-bit binary number before the output circuit transmits the frame of data.

3. The apparatus of claim 1, further comprising:
    an input circuit to receive the data.

4. The apparatus of claim 1, further comprising:
a data source to provide the K-bit binary number.

5. The apparatus of claim 1:
wherein the K-bit binary number represents one or more attributes of the frame.

6. The apparatus of claim 5, wherein the data source comprises:
a processor to determine the one or more attributes of the frame.

7. The apparatus of claim 1, wherein the N-bit address is a media access control (MAC) address.

8. The apparatus of claim 1, wherein the J bits of the N-bit address represent an Organisational Unique Identifier (OUI).

9. The apparatus of claim 8, wherein the frame is an Ethernet frame.

10. The apparatus of claim 8, further comprising:
a memory to store a table associating each OUI with an M-bit index;
wherein, to encode the J bits of the N-bit address as the M-bit binary number, the encoder replaces the J-bit binary number with the associated M-bit index.

11. A method comprising:
transmitting a frame of data, the frame of data comprising an N-bit address field, where N is an integer greater than 1;
encoding J bits of an N-bit address as an M-bit binary number, wherein J and M are integers greater than 1, and M<J and J≦N; and
placing the M-bit binary number and a K-bit binary number in the N-bit address field before the output circuit transmits the frame of data, wherein K is an integer greater than or equal to 1, and K≦J−M.

12. The method of claim 11, further comprising:
receiving the frame of data comprising the N-bit address field, wherein the N-bit address field comprises the N-bit address;
wherein placing the M-bit binary number and a K-bit binary number in the N-bit address field comprises replacing the N-bit address in the N-bit address field with the M-bit binary number and the K-bit binary number.

13. The method of claim 11, further comprising:
receiving the data.

14. The method of claim 11, further comprising:
providing the K-bit binary number.

15. The method of claim 11:
wherein the K-bit binary number represents one or more attributes of the frame.

16. The method of claim 15, further comprising:
determining the one or more attributes of the frame.

17. The method of claim 11, wherein the N-bit address is a media access control (MAC) address.

18. The method of claim 11, wherein the J bits of the N-bit address represent an Organisational Unique Identifier (OUI).

19. An apparatus comprising:
an input circuit to receive a frame of data comprising an N-bit address field, the N-bit address field comprising a J-bit binary number, wherein N and J are integers greater than 1, and J≦N;
a decoder to decode M bits of the J-bit binary number as a J-bit address, wherein M is an integer greater than 1, and M<J; and
an address circuit to provide K further bits of the J-bit binary number, wherein K is an integer greater than or equal to 1, and K≦J−M.

20. The apparatus of claim 19:
wherein the address circuit replaces the J-bit binary number in the N-bit address field of the frame with the J-bit address.

21. The apparatus of claim 20, further comprising:
an output circuit to transmit the frame comprising the N-bit address field comprising the J-bit address.

22. The apparatus of claim 19, further comprising:
an output circuit to transmit the data.

23. The apparatus of claim 19:
wherein the K-bit binary number represents one or more attributes of the frame.

24. The apparatus of claim 23, further comprising:
a processor to process the frame according to one or more of the one or more attributes of the frame.

25. The apparatus of claim 19, wherein the N-bit address is a media access control (MAC) address.

26. The apparatus of claim 19, wherein the J-bit address represents an Organisational Unique Identifier (OUI).

27. The apparatus of claim 26, wherein the frame is an Ethernet frame.

28. The apparatus of claim 26, further comprising:
a memory to store a table associating each OUI with an M-bit index;
wherein, to decode the M bits of the J-bit binary number as the J-bit address, the decoder replaces the M bits of the J-bit binary number with the associated OUI.

29. A method comprising:
receiving a frame of data comprising an N-bit address field, the N-bit address field comprising a J-bit binary number, wherein N and J are integers greater than 1, and J≦N;
decoding using a decoder M bits of the J-bit binary number as a J-bit address, wherein M is an integer greater than 1, and M<J; and
providing K further bits of the J-bit binary number, wherein K is an integer greater than or equal to 1, and K≦J−M.

30. The method of claim 29, further comprising:
replacing the J-bit binary number in the N-bit address field of the frame with the J-bit address.

31. The method of claim 30, further comprising:
transmitting the frame comprising the N-bit address field comprising the J-bit address.

32. The method of claim 30, further comprising:
transmitting the data.

33. The method of claim 30:
wherein the K-bit binary number represents one or more attributes of the frame.

34. The method of claim 33, further comprising:
processing the frame according to one or more of the one or more attributes of the frame.

35. The method of claim 29, wherein the J-bit address is a media access control (MAC) address.

36. The method of claim 29, wherein the J-bit address represents an Organisational Unique Identifier (OUI).

37. A system comprising:
at least one of an output circuit to transmit a frame of data and an input circuit to receive the frame of data, wherein the frame of data includes:
a payload field comprising the data; and
at least one N-bit address field comprising an N-bit address comprising an M-bit binary number representing an encoded J-bit address of the frame of data, wherein N, M, and J are integers greater than 1, M<J and J≦N.

38. The system of claim 37:
wherein the N-bit address further comprises a K-bit binary number, wherein K is an integer greater than or equal to 1, and $K \leq J-M$.

39. The system of claim 38:
wherein the K-bit binary number represents one or more attributes of the frame of data.

* * * * *

UNITED STATES PATENT AND TRADEMARK OFFICE
CERTIFICATE OF CORRECTION

| | |
|---|---|
| PATENT NO. | : 7,548,563 B1 |
| APPLICATION NO. | : 11/196993 |
| DATED | : June 16, 2009 |
| INVENTOR(S) | : Michael Orr |

It is certified that error appears in the above-identified patent and that said Letters Patent is hereby corrected as shown below:

Column 1, Line 10        Delete "March 31, 2005" and insert -- April 1, 2005 --

Signed and Sealed this

Fourth Day of August, 2009

*John Doll*

JOHN DOLL
*Acting Director of the United States Patent and Trademark Office*